United States Patent [19]

Lusk et al.

[11] 4,212,696
[45] Jul. 15, 1980

[54] METHOD OF MAKING AN ORGANIC COMPOSITE ELECTRICAL INSULATOR SYSTEM

[75] Inventors: George E. Lusk, Woodstock; Sioe T. Mak, Crystal Lake; John C. Haarsma, Barrington, all of Ill.

[73] Assignee: Joslyn Mfg. and Supply Co., Chicago, Ill.

[21] Appl. No.: 727,757

[22] Filed: Sep. 29, 1976

[51] Int. Cl.² .................. H01B 19/00; H01B 17/02; H01B 17/66
[52] U.S. Cl. .................................. 156/294; 29/631; 156/329; 174/179
[58] Field of Search ............... 174/80, 176, 177, 178, 174/179, 209; 29/631; 156/305, 308, 310, 294

[56] References Cited

U.S. PATENT DOCUMENTS

| | | | |
|---|---|---|---|
| 2,017,519 | 10/1935 | Waldron | 174/80 X |
| 2,732,423 | 1/1956 | Morrison | 174/179 X |
| 3,387,839 | 6/1968 | Miller et al. | 156/310 X |
| 3,802,989 | 4/1974 | Huber | 156/308 X |
| 3,898,372 | 8/1975 | Kalb | 174/179 |

OTHER PUBLICATIONS

O'Malley, Wm. J., "Silicone Pressure-Sensitive Adhesives for Flexible Printed Circuits", *Adhesives Age*, Jun. 1975, pp. 17-20.

*Primary Examiner*—Laramie E. Askin
*Attorney, Agent, or Firm*—Mason, Kolehmainen, Rathburn & Wyss

[57] ABSTRACT

An organic composite electrical insulator system includes one or more modular ethylene propylene copolymer elastomeric molded insulators or sheds bonded by a thin line bond to an epoxy or polyester resin bonded fiberglass structural member. In one embodiment, the organic composite insulator system may take the form of a suspension insulator used to support a high voltage power cable from a transmission tower. The suspension insulator includes a pair of metallic end connectors mechanically attached to opposite longitudinal ends of an elongated polyester resin bonded fiberglass core rod. The space between the end connectors along the rod is filled with a plurality of modular ethylene propylene elastomeric molded insulators or sheds having inner diameters smaller than the outside diameter of the rod in order to obtain a slip fit and thereby compressively load the interface surfaces between the sheds and the rod during the manufacture of the rod. All interface surfaces between the sheds and the rod are precoated with an adhesive prior to the assembly of the sheds on the rod. As soon as the adhesive coatings are completely dry, the sheds are stretched over the rod and slid into their final position. The rod with its assembled sheds is then subjected to a moderate temperature cure to bond the sheds to each other and to the rod.

9 Claims, 2 Drawing Figures

METHOD OF MAKING AN ORGANIC COMPOSITE ELECTRICAL INSULATOR SYSTEM

BACKGROUND OF THE INVENTION

A. Field of the Invention

The device of the present invention relates generally to a new and improved organic composite electrical insulator system and to a new and improved method of manufacturing an organic composite electrical insulator system.

B. Description of the Prior Art

Electrical insulator systems for supporting compressive or tensile loads or for housing electrical components are old and well known in the art. Generally, such insulator systems include a centrally disposed core element and one or more integrally formed or nonintegral insulating elements, such as sheds, disposed about the central core element.

An example of a typical prior art electrical insulator system in the form of a suspension insulator is disclosed in United States patent application Ser. No. 576,731, filed on May 12, 1975 and assigned to the same assignee as the assignee of this application. The suspension insulator disclosed in that prior-filed patent application includes a centrally disposed resin bonded fiberglass rod and a plurality of serially disposed ceramic insulators or sheds disposed about and along the length of the fiberglass rod. The space between the inner surfaces of the sheds and the outer surface of the fiberglass rod is filled with an elastomeric filler, the thermal and mechanical characteristics of which must be taken into account due to the thickness of the filler.

The utility industry in the United States is now beginning to utilize organic electrical insulator systems for outdoor electrical transmission and distribution purposes. Some of the advantages of organic insulator systems are their lower weight, generally lower cost and, in some cases, increased strengths as compared to inorganic insulator systems, such as those systems employing ceramic sheds. U.S. Pat. Nos. 3,358,076; 3,735,019; and 3,898,372 disclose several different configurations of organic electrical insulator systems. The systems disclosed in the U.S. Pat. Nos. 3,735,019 and 3,898,372 utilize a central core member formed of resin-bonded glass fibers and a plurality of modular sheds formed with central apertures having inner diameters less than the outer diameters of the core members to retain and seal the sheds on the core members.

These prior art patents disclose the use of insulating grease or adhesive to enable the sheds to be slipped over the rod to their final desired position and to seal the interface surfaces to prevent the formation of air voids and the resultant deterioration of the insulator systems.

One major disadvantage of the organic composite insulator systems disclosed in these patents is that the grease or adhesive may separate from portions of the interface surfaces between the core members and the sheds to thereby form air voids and regions of reduced electrical strength, resulting in a reduction of the electrical impulse strength of the electrical insulator systems.

SUMMARY OF THE INVENTION

An object of the present invention is to provide a new and improved electrical insulator system.

Another object of the present invention is to provide a new and improved organic electrical insulator system.

Another object of the present invention is to provide a new and improved organic composite electrical insulator system.

Another object of the present invention is to provide a new and improved method of manufacture of a composite electrical insulator system.

Another object of the present invention is to provide a new and improved method of manufacture of an organic composite electrical insulator system.

Another object of the present invention is to provide a new and improved suspension insulator.

Briefly, the present invention is directed to a new and improved organic composite electrical insulator system having a centrally disposed epoxy or polyester fiberglass structural member and one or more modular ethylene propylene copolymer elastomeric molded insulators or sheds disposed about and bonded to the structural member. The sheds are contoured to provide proper water shedding and the desired amount of surface leakage distance for the level of contaminated service strength desired.

The insulators are molded with inner diameters less than the outer diameters of the structural members over which they are mounted to compressively load all interfacing surfaces of the structural member and the insulators that were precoated with an adhesive prior to the assembly of the insulators on the structural member. After the adhesive coatings are completely dry, the insulators are stretched over the structural member and placed in their final desired position. The adhesive is then cured by cross-linking or by increasing the chain length of a polymeric adhesive to bond the insulators to the structural member. In a preferred embodiment, the adhesive is heat cured. In this embodiment, the temperature at which the adhesive is cured must be below the secondary transition temperature of the bonded materials so as not to alter the physical and mechanical characteristics of the bonded materials. In this manner, a very high integrity mechanical and electrical bond between the insulators and the support member is achieved.

BRIEF DESCRIPTION OF THE DRAWING

The above and other objects and advantages and novel features of the present invention will become apparent from the following detailed description of a preferred embodiment of the invention illustrated in the accompanying drawing wherein.

DESCRIPTION OF THE PREFERRED EMBODIMENT

Figure 1:
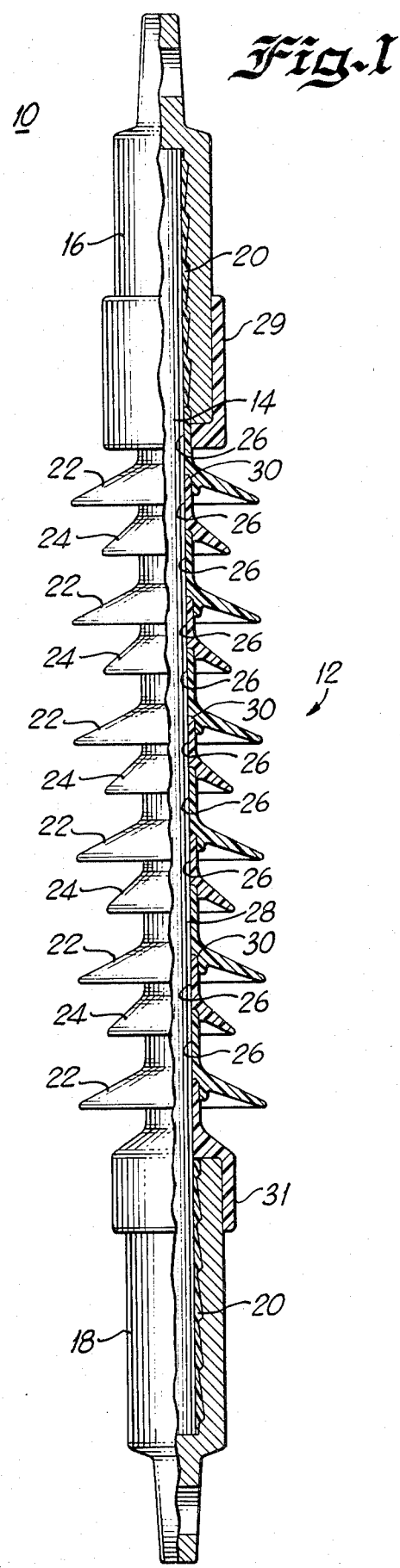
FIG. 1 is a fragmentary, elevational view of a suspension insulator having an organic composite electrical insulator system assembled and manufactured in accordance with the principles of the present invention.
Figure 2:
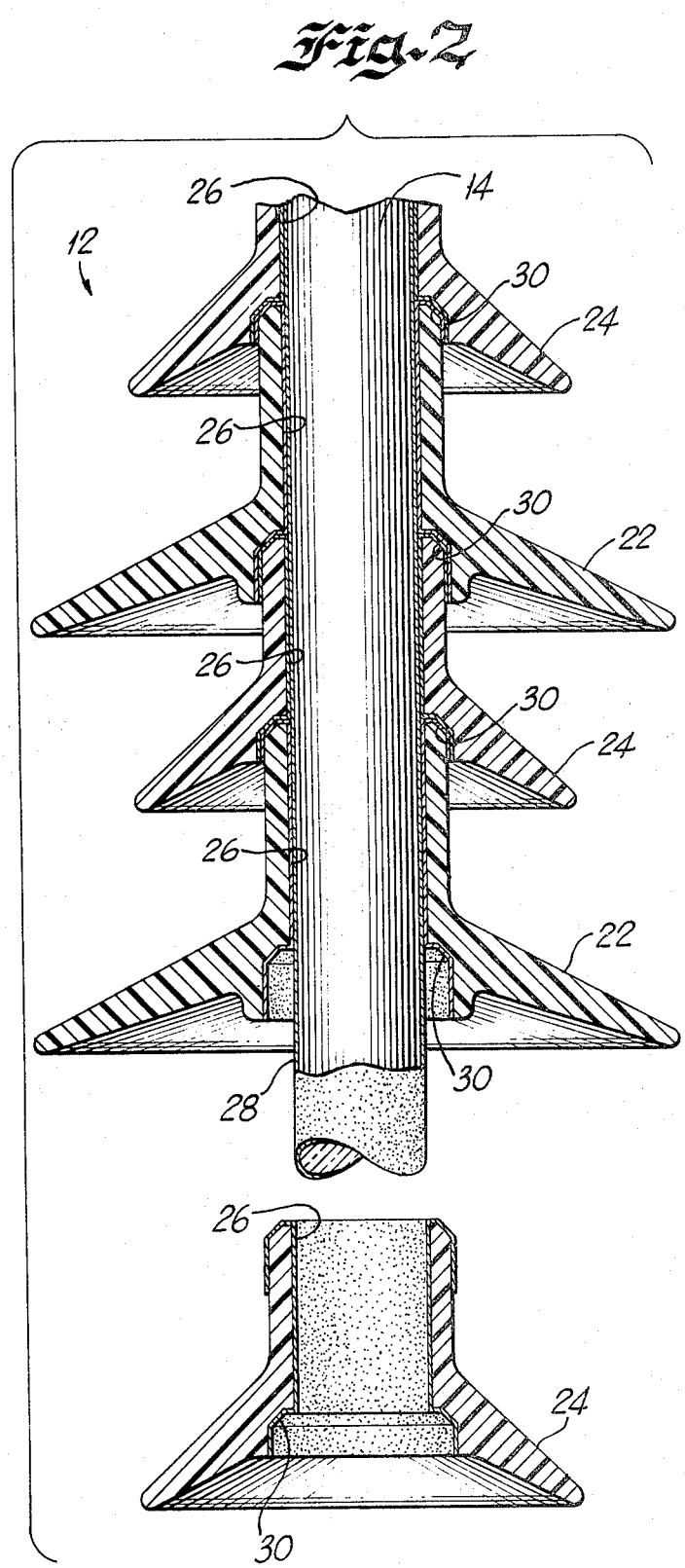
FIG. 2 is an enlarged, partially elevational and partially cross-sectional view of a portion of the device of FIG. 1.

With reference to FIGS. 1 and 2 of the drawing, there is illustrated a new and improved suspension insulator 10 including a new and improved organic composite electrical insulator system 12 constructed in accordance with the principles of the present invention. The insulator 10 may be used to suspend high voltage power cables from transmission towers by attaching one longitudinal end of the insulator 10 to an arm of the tower and the other longitudinal end to a high voltage power cable. The insulator 10 includes an elongated suspension element or rod 14 preferably of the polyester resin bonded, glass reinforced type. Mounted on the ends of the rod 14 are a pair of end fittings or connectors 16 and 18 secured to the rod 14 by an epoxy resin wedge rod attachment system 20 as described in the above-identified copending patent application that is incorporated herein by reference for all purposes.

In accordance with an important feature of the present invention, the composite electrical insulator system 12 includes a plurality of shells, skirts or sheds 22 and 24, each having an interior bore or surface 26 adjacent to the outer surface 28 of the rod 14 and shed mating surfaces 30 at the interfaces between serially disposed sheds 22 and 24. In addition, an upper shedless insulator 29 and a lower shedless insulator 31 are disposed at opposite longitudinal ends of the insulator 10.

In accordance with a specific embodiment of the present invention, the sheds 22 and 24 and the insulators 29 and 31 are individually molded as separate ethylene propylene copolymer elastomeric molded modules in configurations that provide the desired water shedding and surface leakage distance characteristics desired for the particular operating level and conditions of the suspension insulator 10.

The sheds 22 and 24 and the insulator 31 are molded with inner diameters less than the outer diameter of the rod 14. All of the mating surfaces between the sheds 22 and 24, the insulators 29 and 31 and the rod 14, that is, the surfaces 26, 28 and 30, are precoated with a polymeric adhesive which is non-tacky when dried and is capable of drying without complete curing, prior to the assembly of the sheds 22 and 24 and the insulators 29 and 31 on the rod 14. The adhesive coatings depicted in FIG. 2 are shown with exaggerated thicknesses for illustrative purposes only and are not necessarily shown in true scale.

In assembling the insulator 10, the top end connector is attached to one end of the rod 14 by the system 20. Subsequently, when the adhesive coatings are completely dry, the sheds 22 and 24 and the insulators 29 and 31 are stretched over the rod 14 and slid into their final desired position. The close interference fit provided by the undersized sheds 22 and 24 provide the necessary compressive loading on the adhesive coatings at the surfaces 26, 28 and 30 to enable a high mechanical and electrical integrity bond to be developed at all of the interfaces between the sheds 22 and 24, the insulators 29 and 31 and the rod 14. The rod 14 and the sheds 22 and 24 and the insulators 29 and 31 assembled thereon and axially compressed along the longitudinal axis of the rod 14 are then subjected to a moderate temperature cure to activate and cross-link the adhesive coatings applied to the surfaces 26, 28 and 30, thereby bonding the sheds 22 and 24 and the insulators 29 and 31 to each other and the sheds 22 and 24 and the insulator 31 to the rod 14. Subsequently, the connector 18 may be atached to the opposite longitudinal end of the rod 14 by the attachment system 20.

In this manner, a new and improved lightweight, inexpensive and highly reliable composite insulator system is provided that in a specific embodiment of the invention may take the form of the suspension insulator 10. As a general rule, the cured adhesive used should exhibit thermal mechanical stability over the complete service temperature range of the insulator system, for example, $-50°$ C. to $+55°$ C. for the suspension insulator 10. The uncured, dried adhesive should exhibit low surface tension to ensure bond establishment between molded parts that may include a residual mold release agent on one or more surfaces. The uncured adhesive should also have high peel strength and low coefficient of friction in an essentially one hundred percent solids condition after drying and before curing and cross-linking.

In accordance with an important feature of the present invention, all of the mating surfaces between the sheds 22 and 24, the insulators 29 and 31, and the rod 14, that is, the surfaces 26, 28, and 30 are coated before assembly with an adhesive which can be rendered completely non-tacky, as by total solvent removal, after coating said surfaces. In this manner, when the sheds 22 and 24 and the insulators 29 and 31 are stretched over the rod 14, they can slide into their final desired position easily without removing the adhesive needed between the mating surfaces.

To achieve the full advantage of the present invention, all mating surfaces are pre-coated with the adhesive and the adhesive is completely dried before assembly of the electrical insulator system and before complete curing of the adhesive. If only one of two mating surfaces is coated with the adhesive, when the adhesive is cured in place, the cured or cross-linked adhesive may not completely coat the second surface. In accordance with a preferred embodiment of the present invention, each mating surface is coated with an adhesive which, when dried, coats each surface to a thickness in a range of 1–4 mils to provide a total dry solid adhesive interface thickness in the range of 2–8 mils.

In accordance with a preferred embodiment of the present invention, the adhesive comprises a copolymer of a highly branched dimethyl silicone polymer and a non-branched dimethyl silicone polymer. Such a polymer is manufactured by General Electric Co. under the trademark Silgrip SR-573. Silgrip SR-573 is described in the publication Adhesives Age, June, 1975, pages 17–20. A condensation product of a silicone gum, such as a dialkylpolysiloxane, for example, dimethylpolysiloxane, and an MQ silicone resin (ASTM D-1418), such as a silicone resin having the formula

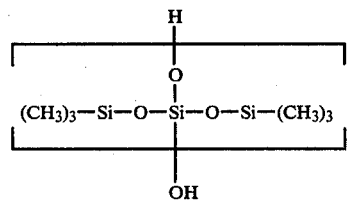

has been found exceptionally well suited for the purposes of the present invention since the copolymer can be diluted with solvent to any desired degree, to achieve a desired viscosity, and the diluted composition can be coated on the inner surface of the sheds 22 and 24, and insulators 29 and 31, and coated on the outer surface of the rod 14 to provide an even coating of adhesive of practically any desired thickness. Further, the dried polymer is completely non-tacky, and is dried without curing to provide a smooth adhesive coating having an extremely low coefficient of friction, enabling easy assembly of parts. Any adhesive which can be completely dried without complete curing is useful as the coating adhesive in accordance with the principles of the present invention so long as the adhesive is capable of curing, after assembly. The cure can be initiated by heat, radiant energy, a curing catalyst such as a peroxide, or any other suitable curing means.

It is an important feature of the present invention that the adhesive is substantially void of solvent when the sheds 22 and 24 and the insulators 29 and 31 are placed over rod 14 and slid into their final position. If the adhesive is not completely dry, sliding the sheds and insulators into place will remove some of the adhesive from the mating surfaces, thereby causing air voids, resulting in reduced electrical strength. Further, if solvent is present in the adhesive, bubbles will form during curing to cause a further reduction in electrical impulse strength. Accordingly, the adhesive is completely dried prior to assembling the electrical insulator system of the present invention.

Suitable solvents for diluting the adhesives include xylene, trichlorotrifluoroethane, butyl acetate, various glycol ethers, and Amsco Special Naphthalite 66/3. Since the solvents are evaporated prior to assembling the electrical insulator system of the present invention, the particular ratio of adhesive to solvent is not critical but can be varied for the purpose of obtaining coatings of a desired thickness in one coating operation, for example, in the range of 1-4 mils. It is preferred to dilute the adhesive to a solids level in the range of 10-40% by weight, with 60-90% by weight solvent.

In accordance with a preferred embodiment of the present invention, the rod 14 is coated with an adhesive composition having a lower solids level than the adhesive composition used to coat the inner surfaces of the sheds 22 and 24 and the insulators 29 and 31. It is preferred to coat the inner surfaces of the sheds 22 and 24 and insulators 29 and 31 with an adhesive composition comprising 25-40% by weight solids and to coat the outer surface of the rod 14 with an adhesive composition comprising 20-35% by weight solids, since the interior surfaces of the sheds and insulators will be more difficult and time consuming to dry. An adhesive composition comprising Silgrip SR-573 in 65% by weight xylene solvent has a viscosity in the range of 50,000-60,000 centipoises at 23° C. when measured with a Brookfield viscometer model RVT using Spindle #6. The mating surfaces can be coated in any manner known in the art such as by brush-coating, fountain-flooding or die-wiping and after coating the sheds 22 and 24, the insulators 29 and 31, and rod 14, the adhesive can be dried quickly and efficiently such as in a forced air oven, at a temperature, for example, in the range of 120°-140° F. The adhesive can be cured without a catalyst by heat curing at, for example, 180° F. for approximately twelve hours. If desired, a curing catalyst, for example, a peroxide catalyst such as 2,4-dichlorobenzoyl peroxide, can be included within the adhesive composition to achieve a faster rate of cure. However, if a curing catalyst such as 2,4-dichlorobenzoyl peroxide is used, the adhesive will cure almost instantaneously at 300° F. To ensure that the interface reaches curing temperature, however, the assembled electrical insulator system should remain in the forced air oven for about two hours.

The required bonding time is an inverse non-linear function of the curing temperature. In a specific manufacturing process, the suspension insulator 10 (without the lower end fitting 18), using coatings of the above-identified silicone polymeric adhesive, was cured for approximately sixteen hours at a temperature of 180° F. Since the adhesive coatings' thicknesses are very small in a direction perpendicular to the longitudinal axis of the rod 14, the expansions and contractions of the resultant bond are negligible and may be ignored. Thus, it is to be understood that, within the scope of the appended claims, the invention may be practiced otherwise than as specifically described above.

What is claimed and desired to be secured by Letters Patent of the United States is:

1. A method of manufacturing an electrical insulator system having in an assembled condition a resin-bonded fiberglass core member and a plurality of ethylene-propylene copolymer elastomeric electrically insulating elements disposed about said core member, each one of said plurality of insulating elements having an elongated bore, at least an elongated portion of said bore having an inner diameter less than the outer diameter of said core member prior to disposition of said one insulating element about said core member, comprising the steps of:

applying a silicone adhesive composition to at least some of the interface surfaces of both said plurality of insulating elements and said core member;

completely drying said adhesive composition so that said silicone adhesive composition is non-tacky and exhibits a low coefficient of friction at said interface surfaces;

subsequent to said drying step, assembling said plurality of insulating elements about said core member without the application of further lubrication to said interface surfaces of said plurality of insulating elements over the outer interface surface of said core member to thereby bring said interface surfaces into direct physical engagement and to thereby compressively load said interface surfaces and;

subsequent to said assembling step, curing said adhesive composition to adhesively bond said plurality of insulating elements to said core member at said interface surfaces.

2. A method as defined in claim 1 wherein said silicone adhesive composition comprises an air drying, thermal curing silicone adhesive.

3. A method as defined in claim 2 including adding a solvent to a silicone adhesive to form a diluted silicone adhesive composition thereby decreasing the viscosity of said silicone adhesive and wherein said drying step comprises the step of removing said solvent to dry said silicone adhesive composition.

4. A method as defined in claim 1 wherein said adhesive composition is not cured beyond the B-stage during drying.

5. A method as defined in clam 1 wherein said adhesive composition is dryed without complete curing.

6. A method as defined in claim 1 wherein said applying step comprises the steps of flooding the inner interface surfaces of said plurality of insulating elements with said adhesive composition and thereafter removing a substantial portion of said adhesive composition from said inner interior surfaces to thereby coat said inner interior surfaces with said adhesive composition.

7. A method as defined in claim 1 wherein the adhesive comprises a condensation product of dimethylpolysiloxane with a silicone resin having the structural formula:

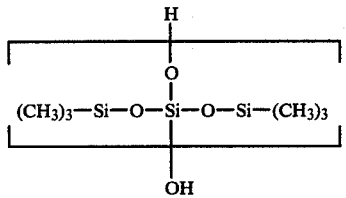

8. A method of manufacturing an electrical insulator system having in an assembled condition a resin-bonded fiberglass core member and a plurality of ethylene propylene copolymer elastomeric electrically insulating elements disposed about said core member, each one of said plurality of insulating elements having an elongated bore, at least an elongated portion of the inner surface said bore having an inner diameter less than the outer diameter of the outer surface of said core member prior to disposition of said one insulating element about said core member, comprising the steps of:

applying a first silicone adhesive composition having a solids content and a liquid content to said outer surface of said core member and applying a second silicone adhesive composition having a solids content and liquid content to at least portions of the inner surfaces of said plurality of insulating elements, said first silicone adhesive composition having a lower solids content than the solids content of said second silicone adhesive composition;

completely drying said first and second silicone adhesive compositions so that said first and second silicone adhesive compositions are non-tacky and exhibit low coefficients of friction at said interface surfaces;

subsequent to said drying step, assembling said plurality of insulating elements about said core member without the application of further lubrication to said interface surfaces by sliding the inner interface surfaces of said plurality of insulating elements over the outer interface surface of said core member to thereby bring said interface surfaces into direct physical engagement and to thereby compressively load said interface surfaces and;

subsequent to said assembling step, curing said first and second silicone adhesive compositions to adhesively bond said plurality of insulating elements to said core member at said interface surfaces.

9. A method as defined in claim 8 wherein said first silicone adhesive composition contains about 20% to about 35% by weight solids content prior to drying said first silicone adhesive composition and wherein said second silicone adhesive composition contains about 25% to about 40% by weight solids content prior to drying said second silicone adhesive composition.

UNITED STATES PATENT AND TRADEMARK OFFICE
CERTIFICATE OF CORRECTION

PATENT NO. : 4,212,696

DATED : July 15, 1980

INVENTOR(S) : George E. Lusk et al.

It is certified that error appears in the above—identified patent and that said Letters Patent are hereby corrected as shown below:

Claim 1, column 6, line 30, after "surfaces" insert --by sliding the inner surfaces--;

Claim 5, column 6, line 55, change "clam" to --claim--; and

Claim 8, column 7, line 17, after "surface" insert --of--.

Signed and Sealed this

Twenty-first Day of October 1980

[SEAL]

Attest:

SIDNEY A. DIAMOND

Attesting Officer

Commissioner of Patents and Trademarks